(12) United States Patent
Takahashi et al.

(10) Patent No.: US 7,664,878 B2
(45) Date of Patent: Feb. 16, 2010

(54) COMMUNICATION SYSTEM, MOBILE TERMINAL, RELAY APPARATUS, AND TRANSFER ROUTE LEARNING METHOD

(75) Inventors: Hideaki Takahashi, Yokohama (JP); Masayuki Motegi, Yokohama (JP); Yasuhiro Kato, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 689 days.

(21) Appl. No.: 11/344,015

(22) Filed: Feb. 1, 2006

(65) Prior Publication Data
US 2006/0184663 A1 Aug. 17, 2006

(30) Foreign Application Priority Data
Feb. 1, 2005 (JP) ............................ P2005-025566

(51) Int. Cl.
*G06F 15/173* (2006.01)
(52) U.S. Cl. ................. 709/242; 709/245; 455/437; 455/442; 455/445
(58) Field of Classification Search ................. 709/202, 709/217, 228, 237, 242, 248, 245; 455/436, 455/445, 437, 442
See application file for complete search history.

(56) References Cited

U.S. PATENT DOCUMENTS

| | | | | |
|---|---|---|---|---|
| 6,195,705 B1 * | 2/2001 | Leung | ....................... | 709/245 |
| 6,473,411 B1 * | 10/2002 | Kumaki et al. | ............... | 370/331 |
| 7,095,738 B1 * | 8/2006 | Desanti | ....................... | 370/389 |
| 2006/0184663 A1 * | 8/2006 | Takahashi et al. | ............ | 709/224 |
| 2007/0036160 A1 * | 2/2007 | Pang et al. | ................... | 370/392 |
| 2007/0153741 A1 * | 7/2007 | Blanchette et al. | ........... | 370/331 |
| 2008/0310300 A1 * | 12/2008 | Kim | ........................... | 370/230 |

FOREIGN PATENT DOCUMENTS

| | | |
|---|---|---|
| EP | 1 463 247 A2 | 9/2004 |
| JP | 2001-211205 | 8/2001 |
| JP | 2002-44143 | 2/2002 |

* cited by examiner

*Primary Examiner*—Michael Won
(74) *Attorney, Agent, or Firm*—Oblon, Spivak, McClelland, Maier & Neustadt, L.L.P.

(57) ABSTRACT

A communication system includes a relay apparatus which offers an access link to a mobile terminal, a layer 2 switch which relays data between the relay apparatus and a router on a next hop from a communication destination terminal of the mobile terminal, and a route information notification unit. The route information notification unit notifies, to the relay apparatus and the layer 2 switch in a subnet where the mobile terminal is present, route information including a data link layer unicast address of a packet addressed to the mobile terminal, and a data link layer multicast address thereof in a case where the mobile terminal is activated and in a case where the mobile terminal switches a connection.

8 Claims, 8 Drawing Sheets

COMMUNICATION SYSTEM, MOBILE TERMINAL, RELAY APPARATUS, AND TRANSFER ROUTE LEARNING METHOD

CROSS REFERENCE TO RELATED APPLICATIONS

This application is based upon and claims the benefit of priority from prior Japanese Patent Application P2005-025566 filed on Feb. 1, 2005; the entire contents of which are incorporated by reference herein.

BACKGROUND OF THE INVENTION

1. Field of the Invention

The present invention relates to a communication system, a mobile terminal, a relay apparatus, and a transfer route learning method.

2. Description of the Related Art

In the Internet according to internet protocol (IP) (for example, refer to J. Postel, "Internet Protocol," Request for Comments 791, September, 1981), a router splits a network into plural subnets. In the same subnet, a data frame is transferred according to layer 2 protocol represented by Ethernet (registered trademark) (for example, refer to "LAN/MAN CSMA/CD Access Method," IEEE 802.3, March, 2002). A network in the same subnet is composed of a router preset in a boundary between the subnets, a layer 2 switch or a hub which houses plural hosts and transfers the data frame between the router and the hosts, and the hosts which connect to the layer 2 switch or the hub and make communication with an arbitrary party on the other end. The transfer of the data frame in the subnet is performed by using a layer 2 address. As a typical layer 2 address, there is a MAC address (for example, refer to "LAN/MAN CSMA/CD Access Method," IEEE 802.3, March, 2002). In the case of transmitting a packet addressed to a host present in the subnet, the router refers to a destination IP address of the packet, and obtains a MAC address of the destination host by using neighbor discovery protocol (for example, refer to T. Narten, et al., "Neighbor Discovery for IP version 6 (IPv6)," Request for Comments 2461, December, 1998). After resolution of the destination MAC address, the router creates a data frame, in which the MAC address of the destination host is set as a destination address of the layer 2, and a MAC address of the router is set as a transmission source. Then, the router transfers the data frame into the subnet. As shown in FIG. 1, upon receiving the data frame from an arbitrary port, the hub copies the data frame, and transmits the data frame from all the ports excluding the port, which has received the data frame. Hence, the hub consumes a band in the subnet excessively, and sometimes, collision of data occurs in the hub.

Meanwhile, as shown in FIG. 2, the layer 2 switch owns a bridge forwarding table (BFT) in which mapping of the MAC addresses and the transfer destination ports are registered. Upon receiving the data frame from the arbitrary port, the layer 2 switch refers to the destination MAC address of the data frame, and searches whether the destination MAC address is registered in the BFT. When the destination MAC address is registered in the BFT, the layer 2 switch transmits the data frame from the ports registered in the BFT. Hence, the layer 2 switch can utilize the band in the subnet efficiently as compared with the hub, and prevents the data collision. Upon receiving the data frame from the arbitrary port, the layer 2 switch registers, in the BFT, the transmission source MAC address of the received data frame, and the port, which has received the data frame. When the transmission source MAC address is not registered in the BFT, the layer 2 switch newly registers the transmission source MAC address in the BFT. When the port, which has received the data frame, is different from a port registered in the BFT though the transmission source address is already registered therein, the layer 2 switch changes the port registered in the BFT to the port, which has received the data frame. When the port registered in the BFT coincides with the port, which has received the data frame, the layer 2 switch updates a value called an aging time, which represents a valid period of registration information. By the above-described method, the layer 2 switch creates and updates the BFT.

In IPv4, the destination address resolutions in the layer 2 uses address resolution protocol (ARP) (for example, refer to D. C. Plummer, "Ethernet Address Resolution Protocol," Request for Comments 826, November, 1982). The ARP transmits, to a broadcast address, a request message describing destination IP addresses for which the address resolution is desired to be performed. Hence, the ARP has had a problem of consuming the band in the subnet excessively. The neighbor discovery protocol that is layer 2 address resolution protocol of IPv6 transfers, to a solicited-node multicast address, a neighbor solicitation message requesting the address resolution, thus making it possible to utilize the band in the subnet efficiently. However, unless the layer 2 address registers a multicast address (for example, a MAC multicast address) of the layer 2 in the BFT, the layer 2 switch undesirably transmits the data frame addressed to the MAC multicast address from all the ports. Accordingly, traffic made by the layer 2 switch becomes substantially equivalent to that of broadcast. As a method of allowing the layer 2 switch to learn the MAC multicast address in order to solve the above-described problem, there is MLD snooping (for example, refer to M. Christensen, "Considerations for IGMP and MLD Snooping Switches," draft-left-magma-snoop-11.txt, May, 2004). The MLD browses an ICMP multicast listener report message (for example, refer to R. Vida, "Multicast Listener Discovery Version2 (MLDv2) for IPv6," Request for Comments 3810, June, 2004) transmitted by the host, and registers the MAC multicast address in the BFT. The ICMP multicast listener report message sets the layer 2 destination address of the data frame as a MAC multicast address of a multicast group in which the host joins. Hence, as shown in FIG. 3, the layer 2 switch registers, in the BEFT, the layer 2 destination address of the ICMP multicast listener report message, and the port which has received the ICMP multicast listener report message. According to the MLD snooping, the layer 2 switch can transmit the MAC multicast address only to the port to which the host joining in the multicast group connects, and accordingly, can utilize the band efficiently.

Here, in such a case where the host moves, it is necessary to update the BFT of the layer 2 switch in response to a moving destination of the host. For example, a utilization mode is mentioned, in which, in the subnet, an access point (AP) is connected to the router or the layer 2 switch, thus making it possible for such a mobile host (MH) to connect to the Internet under a wireless environment. The AP offers a wireless link to the MH, owns a BFT equivalently to the layer 2 switch, and also has a function to transfer the data frame. When the AP to which the MH connects is switched, it is necessary for the AP and the layer 2 switch that are present in the same subnet to change the registration information in the BFT concerning the MH which has switched the AP to which the MH is to connect. IEEE 802.11 as a standard of the wireless LAN defines a method of updating the BFTs of the AP and the layer switch 2 in response to the movement of the MH as IEEE 802.11f (for example, refer to "Inter Access Point Protocol," IEEE 802.11f, July, 2003). In the IEEE 802.11f, a layer 2 update frame is defined, and when the MH switches the AP to which the MH concerned is to connect, the frame concerned is transmitted into the same subnet. As shown in FIG. 4, the AP and the layer 2 switch which have received the layer 2 update frame register, in the BFTs, the transmission source MAC address (MAC address of the MH) of the layer 2 update frame, and the port which has received the layer 2 update frame.

However, it is only a MAC unicast address of the MH that the layer 2 update frame can allow the AP and the layer 2 switch to learn, and there has been room for improvement in updating the BFTs efficiently.

Meanwhile, the ICMP multicast listener report is usually transmitted at the time when the host is activated. Hence, the ICMP multicast listener report is not defined so as to be transmitted every time when the MH moves. Although there are some implementations adapted to transmit the ICMP multicast listener report in response to the movement of the MH, such implementations transmit the ICMP multicast report only in the case of a movement in a layer 03, that is, only in the case where the subnet is changed. Hence, the ICMP multicast listener report is not transmitted in the case where the AP is switched in the same subnet. In this case, a neighbor solicitation for the resolution of the layer 2 address transmitted on the last one hop of the MH in the case where an arbitrary party (correspondent node) on the other end of the communication in the Internet starts the communication with the MH as the destination is transmitted to false ports by the AP and the layer 2 switch, or is transmitted from all the ports thereby.

In this connection, in consideration of the above-described problems, it is an object of the present invention to provide a communication system, a mobile terminal, a relay apparatus, and a transfer route learning method, which learn a data link layer unicast address of the MH and a data link layer multicast address thereof in response to the movement of the MH, thereby updating the BFTs efficiently.

SUMMARY OF THE INVENTION

A first aspect of the present invention is to provide a communication system including a relay apparatus which offers an access link to a mobile terminal, and a layer 2 switch which relays data between the relay apparatus and a router on a next hop from a communication destination terminal of the mobile terminal, the communication system, including: a route information notification unit which notifies, to the relay apparatus and the layer 2 switch in a subnet where the mobile terminal is present, route information including a data link layer unicast address of a packet addressed to the mobile terminal, and a data link layer multicast address thereof in a case where the mobile terminal is activated and in a case where the mobile terminal switches a connection.

A second aspect of the present invention is to provide a mobile terminal disposed in a communication system including a relay apparatus which offers an access link to the mobile terminal, and a layer 2 switch which relays data between the relay apparatus and a router on a next hop from a communication destination terminal of the mobile terminal, the mobile terminal, including: a route information notification unit which notifies, to the relay apparatus and the layer 2 switch in a subnet where the mobile terminal is present, route information including a data link layer unicast address of a packet addressed to the mobile terminal, and a data link layer multicast address thereof in a case where the mobile terminal is activated and in a case where the mobile terminal switches a connection.

A third aspect of the present invention is to provide a relay apparatus disposed in a communication system including the relay apparatus which offers an access link to a mobile terminal, and a layer 2 switch which relays data between the relay apparatus and a router on a next hop from a communication destination terminal of the mobile terminal, the relay apparatus, including: a route information notification unit which notifies, to the relay apparatus and the layer 2 switch in a subnet where the mobile terminal is present, route information including a data link layer unicast address of a packet addressed to the mobile terminal, and a data link layer multicast address thereof in a case where the mobile terminal is activated and in a case where the mobile terminal switches a connection.

A forth aspect of the present invention is to provide a transfer route learning method in a communication system including a relay apparatus which offers an access link to a mobile terminal, and a layer 2 switch which relays data between the relay apparatus and a router on a next hop from a communication destination terminal of the mobile terminal, the transfer route learning method, including: (a) notifying, to the relay apparatus and the layer 2 switch in a subnet where the mobile terminal is present, route information including a data link layer unicast address of a packet addressed to the mobile terminal, and a data link layer multicast address thereof in a case where the mobile terminal is activated and in a case where the mobile terminal switches a connection; and (b) updating BFTs owned thereby based on the route information by the relay apparatus and the layer 2 switch.

DETAILED DESCRIPTION OF THE INVENTION

Figure 1:
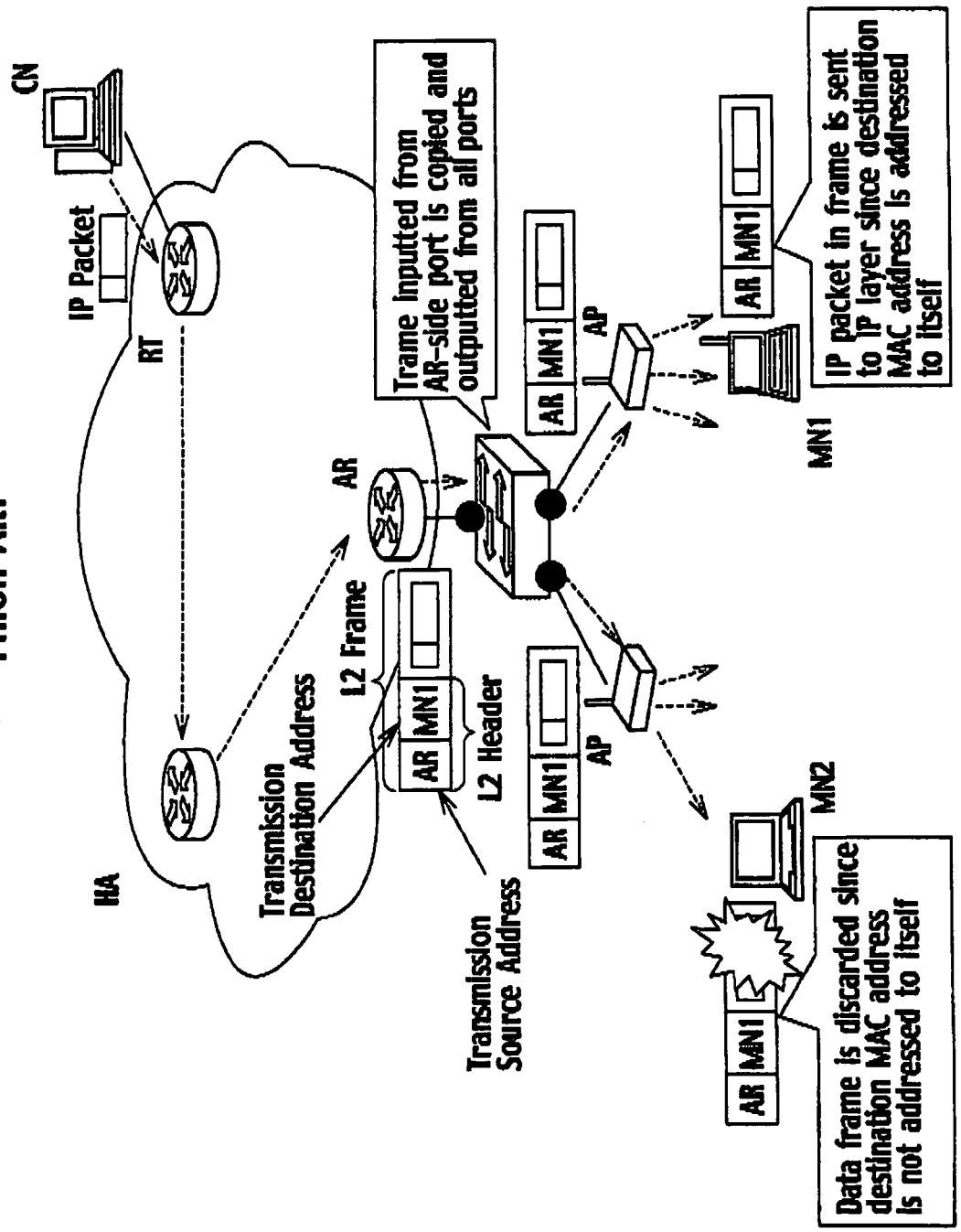
FIG. 1 is a configuration block diagram of a conventional communication system (No. 1).
Figure 2:
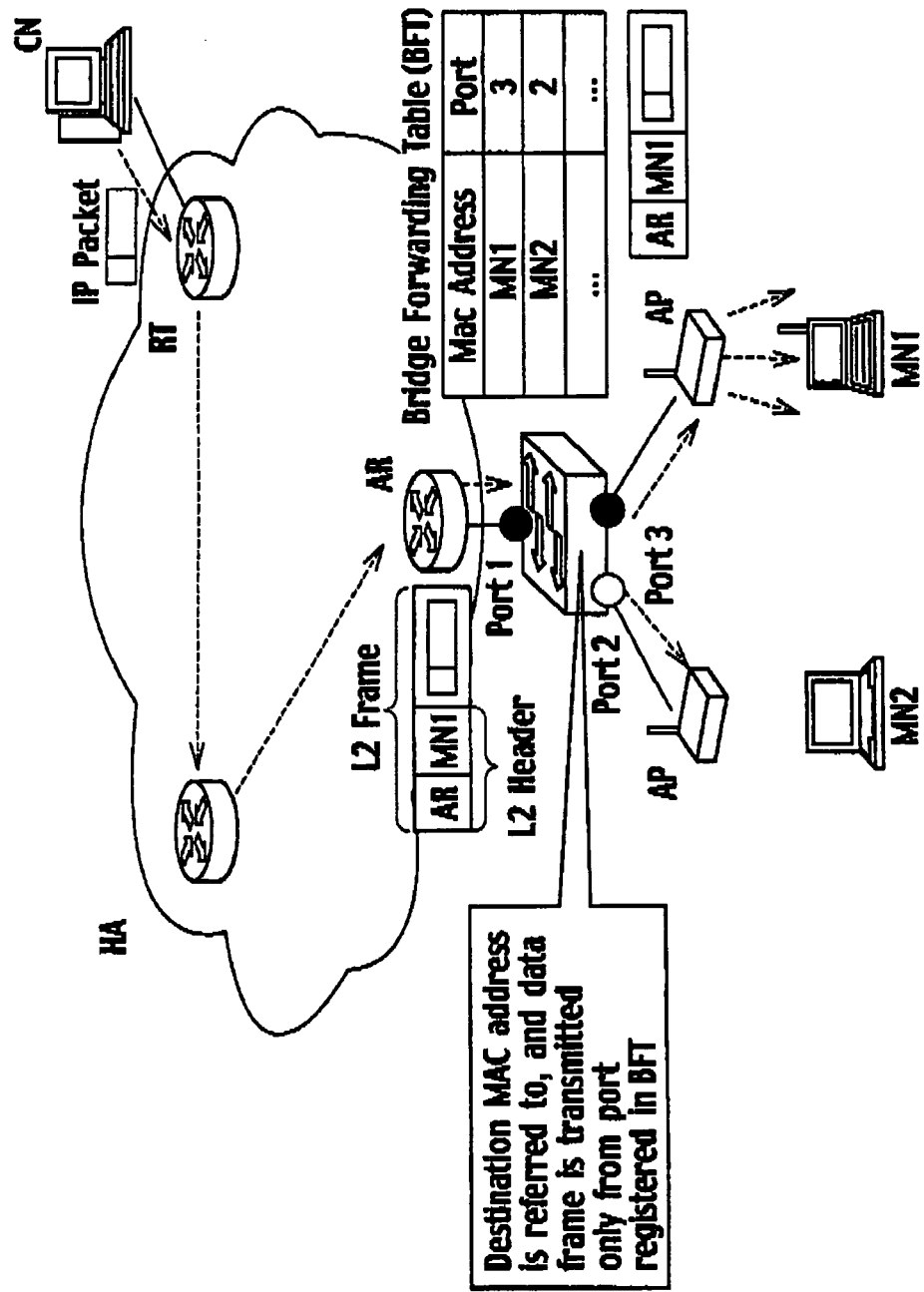
FIG. 2 is a configuration block diagram of a conventional communication system (No. 2).
Figure 3:
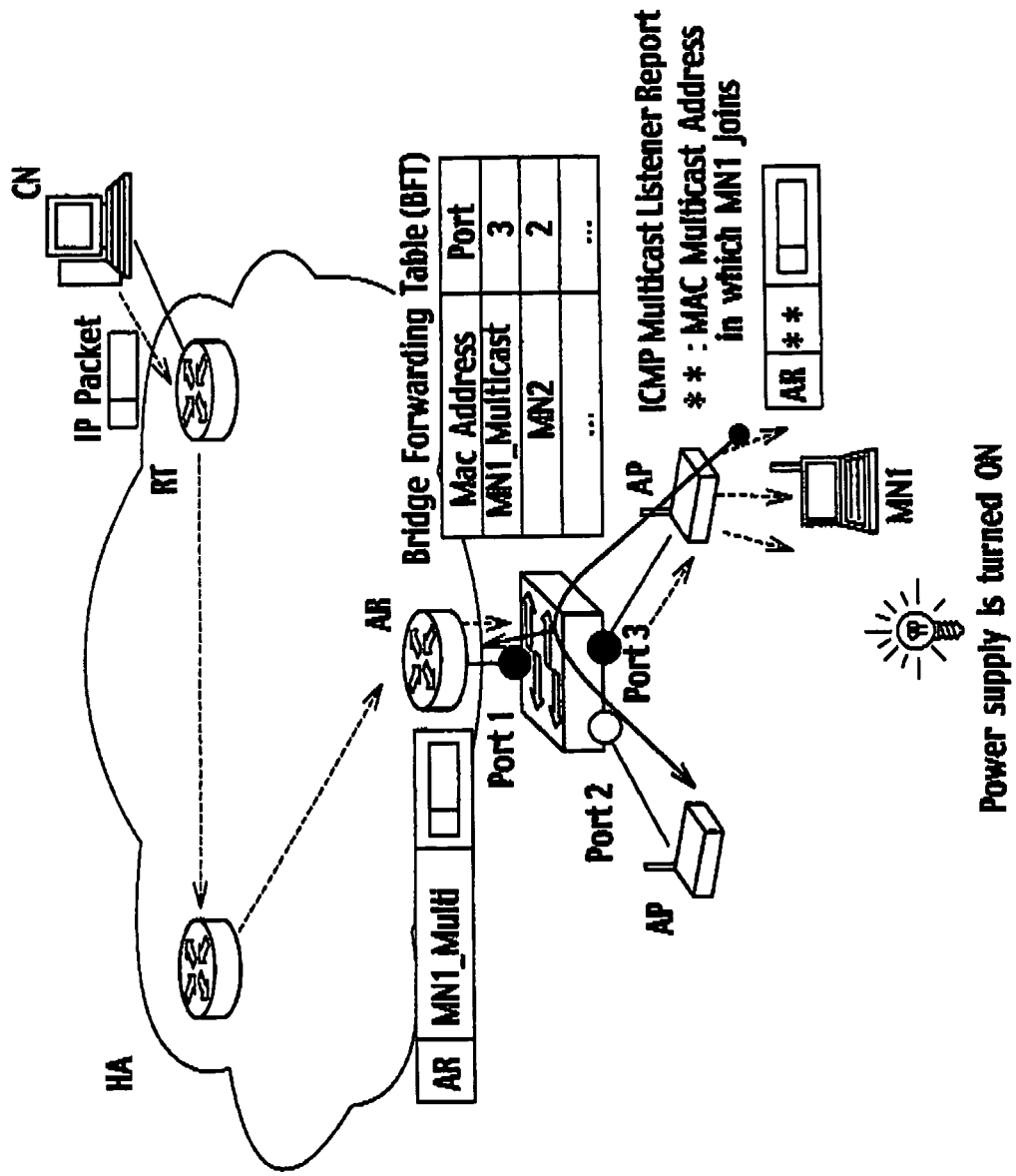
FIG. 3 is a configuration block diagram of a conventional communication system (No. 3).
Figure 4:
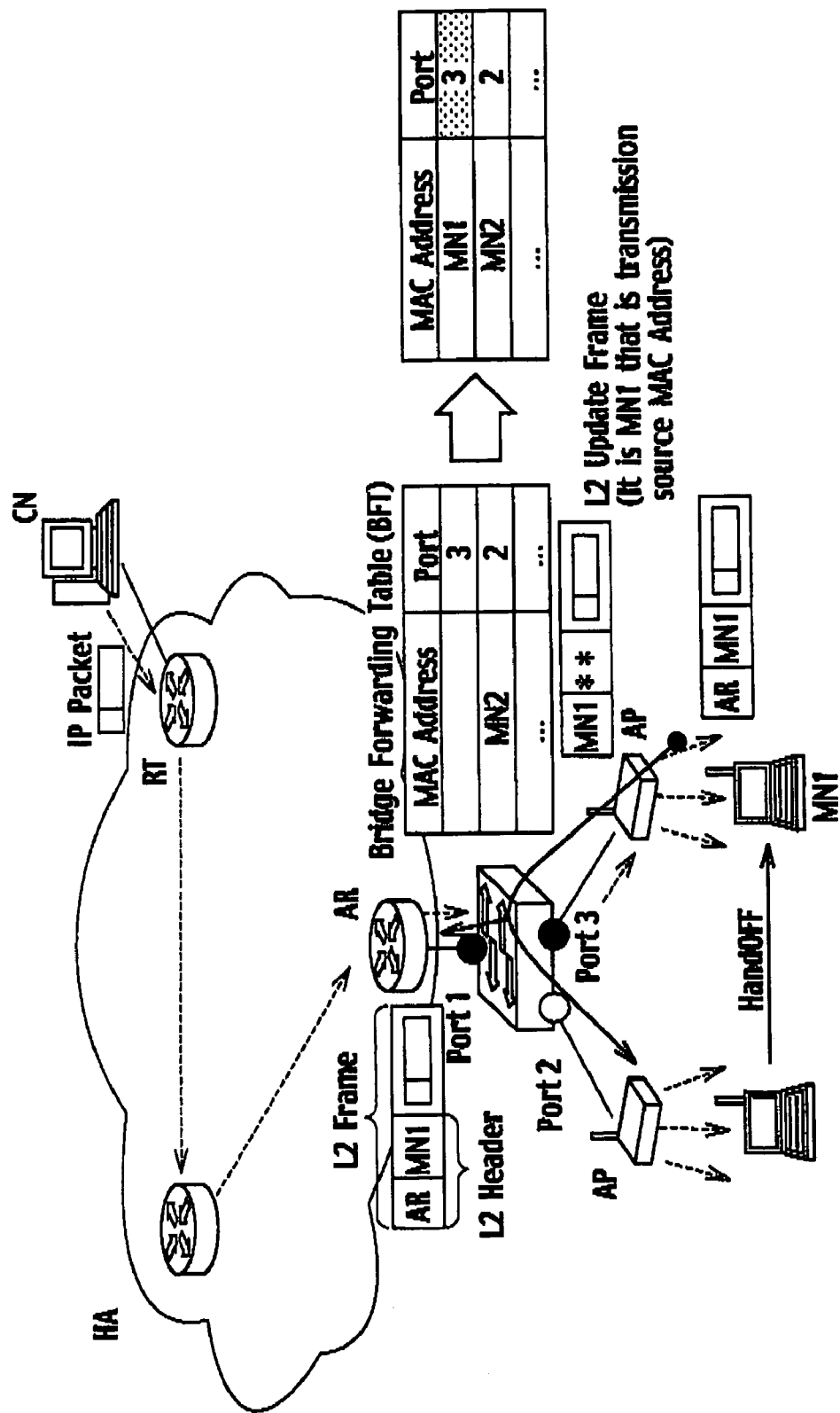
FIG. 4 is a configuration block diagram of a conventional communication system (No. 4).

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIRST EMBODIMENT (Communication System)

Figure 5:
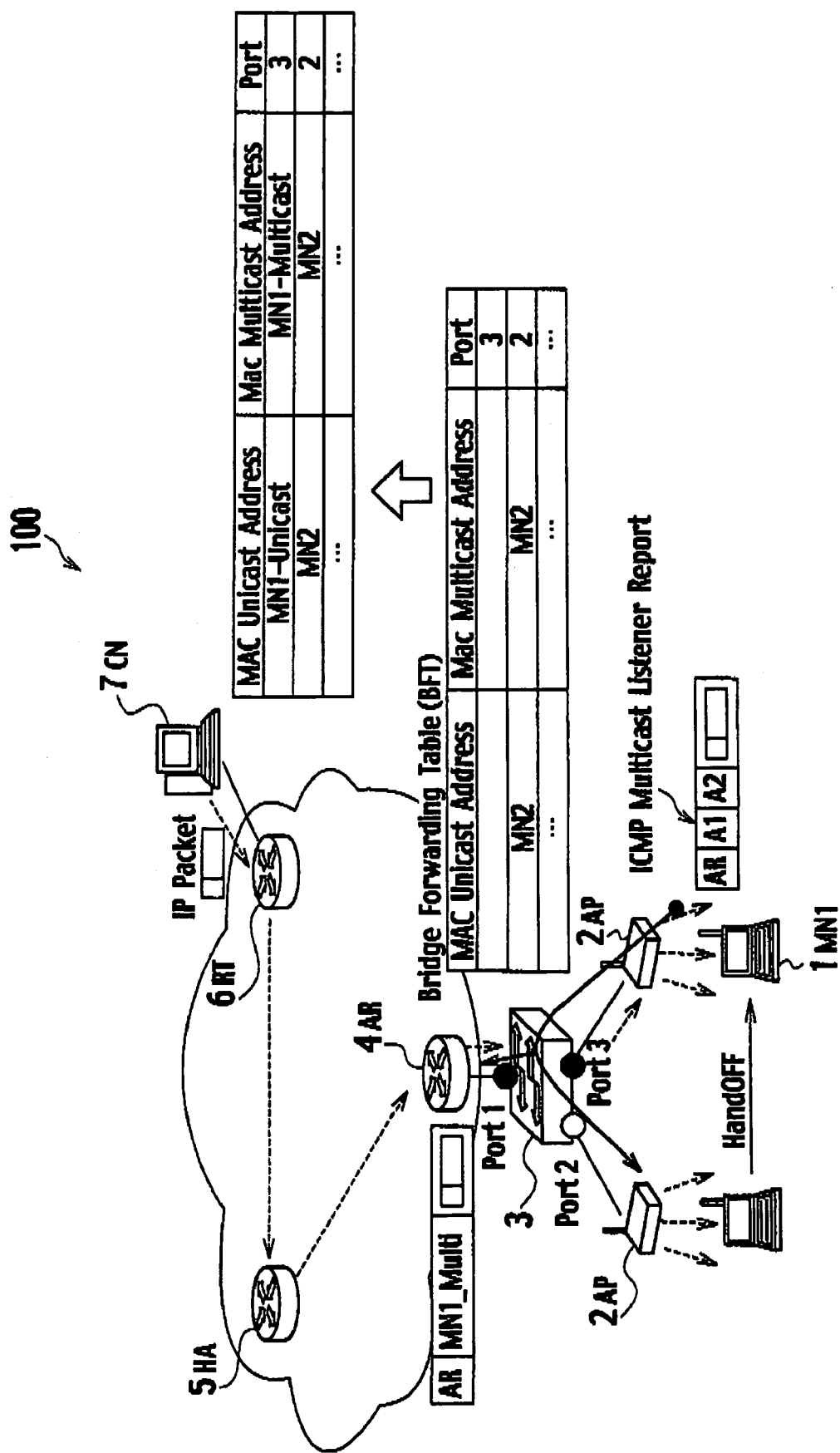
FIG. 5 is a configuration block diagram of a communication system according to first and second embodiments.

As shown in FIG. 5, a communication system 100 according to a first embodiment includes a mobile terminal (mobile node: MN) 1, a relay apparatus (AP) 2 which offers an access link to the MN 1, a router (AR) 4 on the next hop from a communication destination terminal (CN) 7 of the MN 1, a layer 2 switch 3 which relays data between the AR 4 and the AP 2, a router (RT) 6, and a home agent (HA) 5.

Here, the mobile node (MN) is a concept, which is not limited to the above-described mobile host but includes a mobile router (MR) provided in a mobile body such as a train and an aircraft. The MR is an instrument serving as a host in the mobile body or a relay point of a communication toward the mobile host. The MR has such effects as reduction of control signals and reduction of transmission power as compared with the case where each host in the mobile body makes direct communication with an AP located outside of the mobile body.

In the case where the MN 1 is activated, and in the case where the MN 1 switches a connection to the AP 2 in a subnet where the MN 1 is present, the communication system 100 according to the first embodiment transmits an ICMP multicast listener report message to the AP 2 and the layer 2 switch 3 in the same subnet, and allows the AP 2 and the layer 2 switch 3 to simultaneously learn a layer 2 unicast address and layer 2 multicast address of a packet addressed to the MN 1. In the first embodiment, a description will be made by taking a MAC unicast address and a MAC multicast address as examples of the layer 2 unicast address and the layer 2 multicast address.

Figure 6:
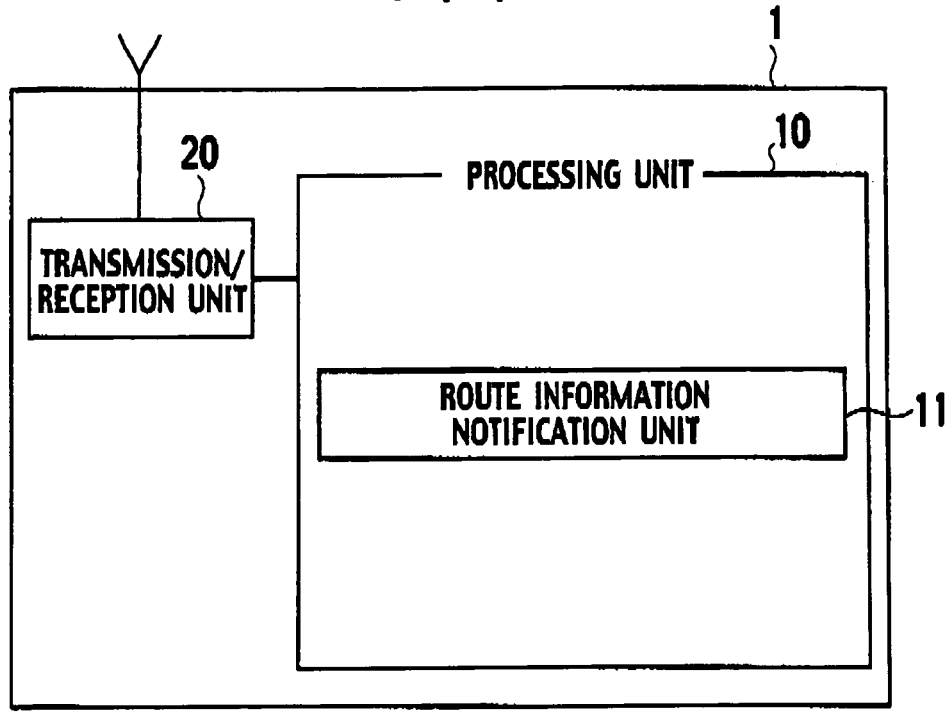
FIG. 6 is a configuration block diagram of an MN according to the first embodiment.

As shown in FIG. 6, the MN 1 according to the first embodiment includes a processing unit 10, and a transmission/reception unit 20 which transmits/receives packet data to/from the AP 2.

The processing unit 10 includes a route information notification unit 11. The route information notification unit 11 notifies route information including the MAC unicast address and the MAC multicast address which are addressed to the MN 1 to the relay apparatus 2 and the layer 2 switch 3 in the subnet where the MN 1 is present in the case where the MN 1 is activated and in the case where the MN 1 switches the connection to the AP 2 in the subnet where the MN 1 is present.

The AP 2 holds a BFT, and updates the BFT based on the route information including the MAC unicast address and the MAC multicast address which are notified from the MN 1.

In a similar way, the layer 2 switch 3 holds a EFT, and updates the BFT based on the route information including the MAC unicast address and the MAC multicast address which are notified from the MN 1.

(Transfer Route Learning Method)

Next, a description will be made of a transfer route learning method according to the first embodiment by using FIG. 7 and FIG. 8.

Figure 7:
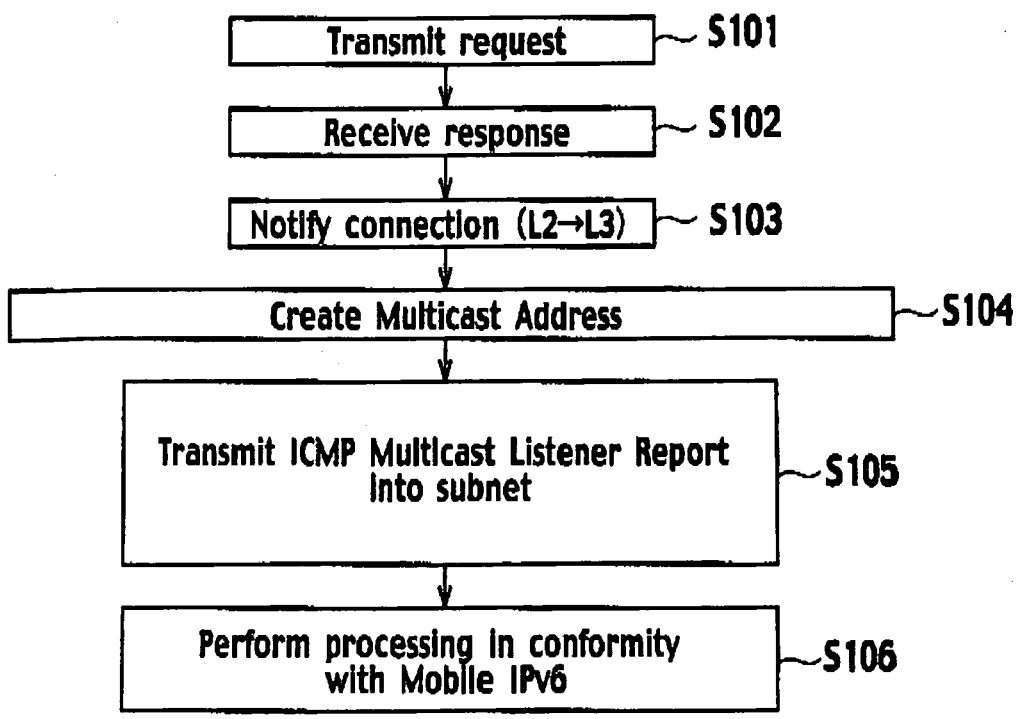
FIG. 7 is a flowchart showing a transfer route learning method according to the first embodiment.
Figure 8:
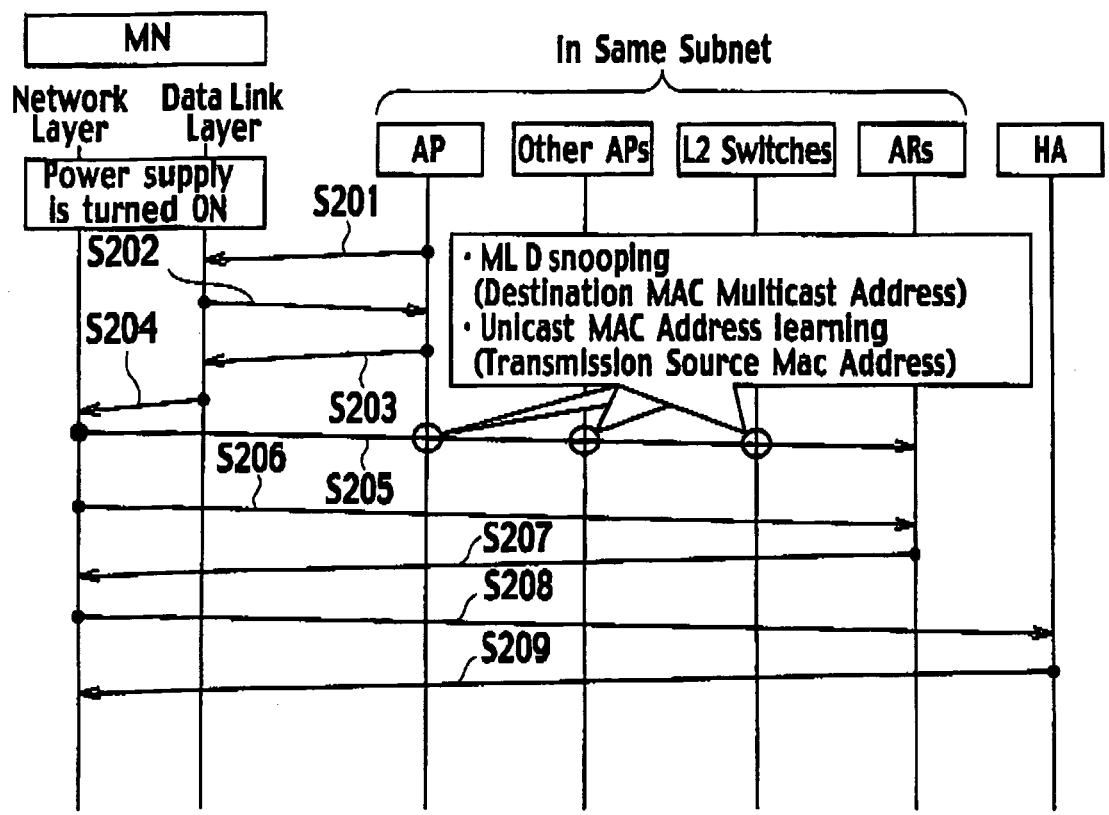
FIG. 8 is a sequence diagram of the transfer route learning method according to the first embodiment.

FIG. 7 shows an operation flow of the MN 1, and FIG. 8 shows an operation sequence example in the case of using Mobile IPv6 (refer to D. Johnson, et al., "Mobility Support IPv6," Request for Comments 3775, June, 2004) as a method of a mobile control of the MN 1.

First, in Step S101 of FIG. 7, at the time of activation, the MN 1 searches cells in the periphery thereof, and transmits an association request (Step S202 of FIG. 8) to the AP 2 of which communication quality is the highest (Step S201 of FIG. 8), thereby performing connection processing with the AP.

Next, the MN 1 having received an association response which notifies the completion of the connection processing with the AP 2 from the AP 2 in Step S102 notifies that the connection processing in the layer 2 is completed to the layer 3 by a link up notification in Step S103 (Step S204 of FIG. 8). The link up notification is one type of information exchange messages between the layer 2 and the layer 3 (for example, refer to Ryoichi KOBAYASHI, Masahiro INOUE, Ichiro OKAJIMA, and Narunori UMEDA, "Examination on Control Information Exchange System Standardized Among Link Layers in IP-Based Mobile Communication System (original title is in Japanese)," The Institute of Electronics, Information and Communication Engineers, Communication Society Congress, September, 2003). The link up notification is a message which notifies, to the layer 3, that the connection processing in the layer 2 is completed, and that it is possible for the layer 3 to transmit/receive a data frame to/from the layer 2.

Moreover, processing in the case where the MN 1 switches the AP 2 as a connection destination thereof is also similar to the above. The MN 1 searches the cells in the periphery thereof, and performs the processing for switching to the AP 2 of which communication quality is the highest at the layer 1 level, and then transmits a reassociation request thereto. An operation of the MN 1 after receiving the reassociation response from the AP 2 is to transmit the link up notification to the layer 3 in a similar way to the time of activation.

Next, in Step S104, upon receiving the link up notification, the MN 1 creates an IPv6 link local address, a solicited-node multicast address, and a MAC multicast address corresponding to the solicited-node multicast address.

Next, in Step S105, after creating the above-described addresses, the route information notification unit of the MN 1 transmits a target multicast address to the solicited-node multicast address of the MN, transmits an IPv6 destination address to an MLD-capable multicast address of the MN, transmits an IPv6 source address to the IPv6 link local address of the MN, transmits a destination address of the layer 2 data frame to the MAC multicast address corresponding to the solicited-node multicast address, and transmits, to the AP 2 and the layer 2 switch 3 in the same subnet, the ICMP multicast listener report message in which a source address of the layer 2 data frame is set as the MAC unicast address of the MN (Step S205 of FIG. 8).

Moreover, simultaneously at the time of transmitting the ICMP multicast listener report, in Step S106, the MN 1 performs movement detection processing (router solicitation of Step S206 in FIG. 8, and router advertisement of Step S207 in FIG. 8) defined by the Mobile IPv6, and performs binding registration processing (binding update of Step S208 in FIG. 8, and binding acknowledgement of Step S209 in FIG. 8) into a home agent (HA) 5.

Meanwhile, in Step S205, the AP 2 and the layer 2 switch 3 which have received the ICMP multicast listener report learn the MAC multicast address of the MN 1, which is designated in the layer 2 frame destination address of the message concerned, by MLD snooping, and register the MAC multicast address in the BFTs. In a similar way, the AP 2 and the layer 2 switch 3 register the MAC unicast address of the MN, which is designated in the layer 2 frame source address of the message concerned, in the BFTs by learning functions provided as standard equipment in the switches. A state in each BFT in this case is updated, for example, as shown in FIG. 5.

(Function and Effect)

The conventional method has just been able to allow the AP 2 and the layer 2 switch 3 to learn only the layer 2 unicast address when the MN connects and switches to the AP, and has just been able to allow the above-described switches to learn the MAC multicast address only when the MN is activated. Hence, the conventional method has been unable to change the BFTs of the AP and the layer 2 switch appropriately in response to the movement of the MN.

In accordance with the communication system 100, the MN 1, and the transfer route learning method according to the first embodiment, in the case where the MN 1 is activated, and in the case where the MN 1 switches the connection to the AP 2 in the subnet where the MN 1 is present, the route information including the data link layer unicast address of the packet addressed to the MN, and the data link layer multicast address thereof can be notified to the AP 2 and the layer 2 switch 3 in the subnet where the MN 1 is present. As described above, the data link layer unicast address of the MN and the data link layer multicast address thereof are learned simultaneously in response to the movement of the MN 1, thus making it possible to update the BFTs efficiently.

Moreover, the MAC unicast address can be set as the data link layer unicast address, and the MAC multicast address can be set as the data link layer multicast address.

Furthermore, the route information can be notified by using the ICMP multicast listener report message. By using the ICMP multicast listener report message, two types of addresses can be learned simultaneously.

SECOND EMBODIMENT

While the description has been made that the MN 1 includes the route information notification unit 11 in the first embodiment, a description will be made of the case where the AP 2 has the route information notification unit in a second embodiment.

(Communication System)

In a similar way to the communication system 100 of the first embodiment, as shown in FIG. 5, a communication system 100 according to the second embodiment includes the mobile terminal (MN) 1, the relay apparatus (AP) 2 which offers the access link to the MN 1, the router (AR) 4 on the next hop from the communication destination terminal (CN) 7 of the MN 1, and the layer 2 switch 3 which relays the data between the AR 4 and the AP 2, the router (RT) 6, and the home agent (HA) 5.

In the second embodiment, in the case where the MN 1 is activated, and in the case where the MN 1 switches the connection to the AP 2 in the subnet where the MN 1 is present, the AP 2 transmits the ICMP multicast listener report message to an AP and the layer 2 switch in the same subnet, and allows the AP and the layer 2 switch to simultaneously learn the layer 2 unicast address and multicast address of the MN. In a similar way to the first embodiment, the second embodiment will also be described by taking the MAC unicast address and the MAC multicast address as examples of the layer 2 unicast address and multicast address.

Figure 9:
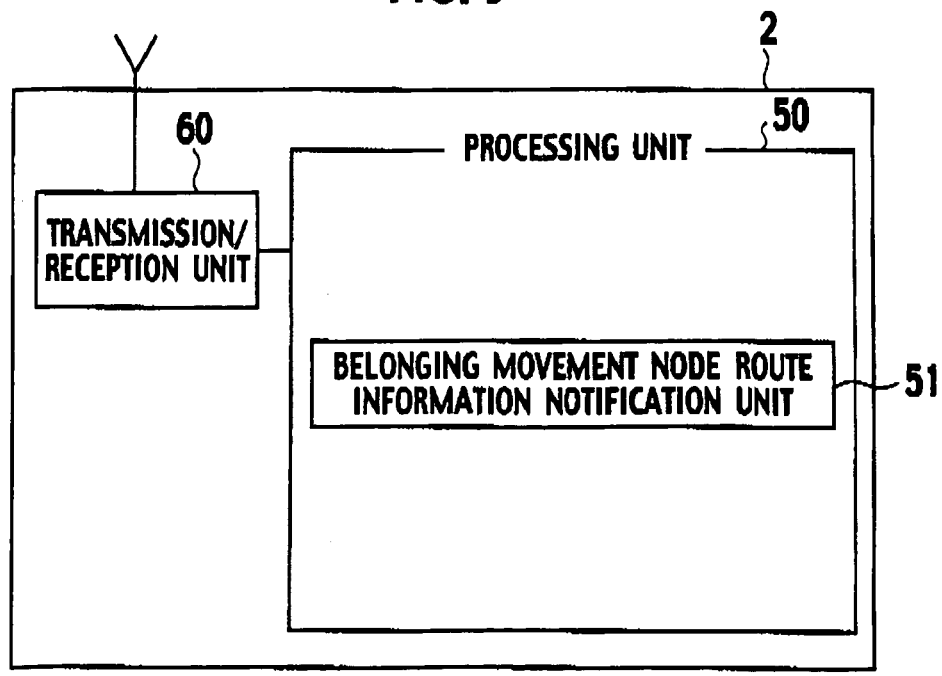
FIG. 9 is a configuration block diagram of an MN according to the second embodiment.

As shown in FIG. 9, the AP 2 according to the second embodiment includes a processing unit 50, and a transmission/reception unit 60 which transmits/receives the packet data to/from the MN 1 and the layer 2 switch 3.

The processing unit 50 includes a belonging movement node route information notification unit 51 which notifies the route information including the MAC unicast address and the MAC multicast address, which are addressed to the MN 1, to the relay apparatus 2 and the layer 2 switch 3 in the subnet where the MN 1 is present in the case where the MN 1 is activated and in the case where the MN 1 switches the connection to the AP 2 in the subnet where the MN 1 is present.

The AP 2 holds a BFT, and updates the BFT based on the route information including the MAC unicast address and the MAC multicast address which are notified from the MN 1.

In a similar way, the layer 2 switch 3 holds a BFT, and updates the BFT based on the route information including the MAC unicast address and the MAC multicast address which are notified from the MN 1.

(Transfer Route Learning Method)

Next, a description will be made of a transfer route learning method according to the second embodiment by using FIG. 10 and FIG. 11.

Figure 10:
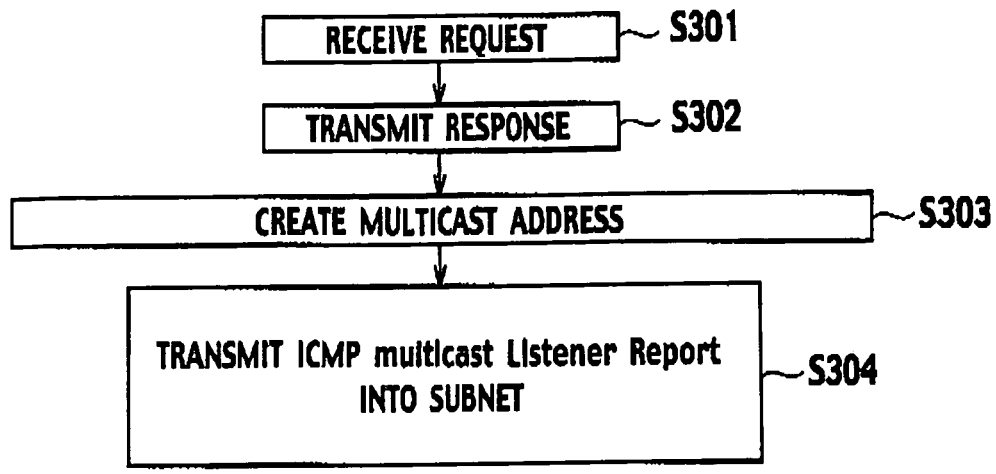
FIG. 10 is a flowchart showing a transfer route learning method according to the second embodiment.
Figure 11:
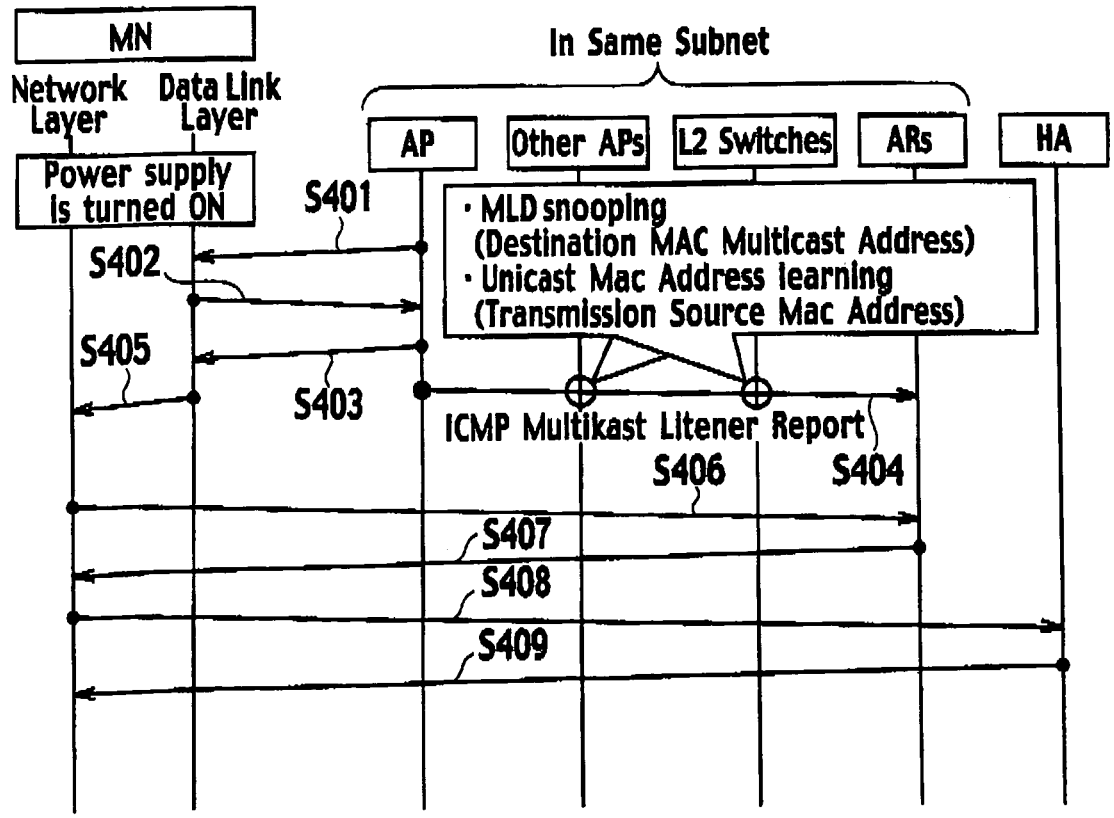
FIG. 11 is a sequence diagram of the transfer route learning method according to the second embodiment.

FIG. 10 shows an operation flow of the AP 2 in the second embodiment, and FIG. 11 shows an operation sequence example in the case of using the Mobile IPv6 as a method of the operation control of the MN 1.

First, in Step S301 of FIG. 10, upon receiving the association request or the reassociation request from the MN 1 (Step S402 of FIG. 11), the AP 2 performs the connection processing with the transmission source MN 1. In Step S302, the AP 2 transmits the association response or the reassociation response to the MN 1 in order to notify, to the MN 1, that the connection processing is completed (Step S403 of FIG. 11).

After the association response or the reassociation response is transmitted, in Step S303, the belonging movement node route information notification unit 51 of the AP 2 creates the IPv6 link local address of the MN1, the solicited-node multicast address thereof, and the MAC multicast address corresponding to the solicited-node multicast address from the MAC unicast address of the MN1, which is notified by the association request or the reassociation request.

Next, after creating the above-described addresses, in step S304, the belonging movement node route information notification unit 51 transmits the target multicast address to the solicited-node multicast address of the MN, transmits the IPv6 destination address to the MLD-capable multicast address, transmits the IPv6 source address to the IPv6 link local address of the MN, transmits the destination address of the layer 2 data frame to the MAC multicast address corresponding to the solicited-node multicast address, and transmits, to the AP 2 and the layer 2 switch in the same subnet, the ICMP multicast listener report message in which the source address of the layer 2 data frame is set as the MAC unicast address of the MN (Step S404 of FIG. 11).

Meanwhile, the MN 1 having received, from the AP 2, the association response which notifies that the connection processing with the AP 2 is completed notifies that the connection processing in the layer 2 is completed to the layer 3 by the link up notification (Step S405 of FIG. 11).

Moreover, simultaneously at the time of transmitting the ICMP multicast listener report, in Step S106, the MN 1 performs the movement detection processing (router solicitation of Step S406 in FIG. 11, and router advertisement of Step S407 in FIG. 11) defined by the Mobile IPv6, and performs the binding registration processing (binding update of Step S408 in FIG. 11, and binding acknowledgement of Step S409 in FIG. 11) into the home agent (HA) 5.

Meanwhile, the AP 2 and the layer 2 switch 3 having received the ICMP multicast listener report in Step S404 in FIG. 11 learn the MAC multicast address of the MN 1, which is designated in the layer 2 frame destination address of the message concerned, by the MLD snooping, and register the MAC multicast address in the BFTs. In a similar way, the AP 2 and the layer 2 switch 3 register the MAC unicast address of the MN, which is designated in the layer 2 frame source address of the message concerned, in the BFTs by the learning functions provided as standard equipment in the switches. A state in each BFT in this case is updated, for example, as shown in FIG. 5.

(Function and Effect)

In accordance with the communication system 100, the AP 2, and the transfer route learning method according to the second embodiment, in the case where the MN 1 is activated, and in the case where the MN 1 switches the connection to the AP 2 in the subnet where the MN 1 is present, the route information including the data link layer unicast address of the packet addressed to the MN, and the data link layer multicast address thereof can be notified to the AP 2 and the layer 2 switch 3 in the subnet where the MN 1 is present. As described above, the data link layer unicast address of the MN and the data link layer multicast address thereof are learned simultaneously in response to the movement of the MN 1, thus making it possible to update the BFTs efficiently.

Moreover, the MAC unicast address can be set as the data link layer unicast address, and the MAC multicast address can be set as the data link layer multicast address.

Furthermore, the route information can be notified by using the ICMP multicast listener report message. By using the ICMP multicast listener report message, two types of addresses can be learned simultaneously.

OTHER EMBODIMENT

The present invention has been described according to the foregoing first and second embodiments. However, it should be understood that the description and the drawings which partially constitute the present disclosure do not limit this invention. From this disclosure, various alternative embodiments and operational technologies will become apparent to those skilled in the art.

For example, in the first and second embodiments, the description has been made that the route information is notified in the case where the MN 1 is activated and in the case where the MN 1 switches the connection to the AP in the subnet where the MN 1 is present. However, the present invention may be applied to the case where the MN 1 switches the connection to an AP 2 in a subnet different from the subnet where the MN 1 is present.

Various modifications will become possible for those skilled in the art after the teachings of the present disclosure without departing from the scope thereof.

What is claimed is:

1. A communication system including a mobile terminal, a relay apparatus which offers an access link to the mobile terminal, and a layer 2 switch which relays data between the relay apparatus and a router on a next hop from a communication destination terminal of the mobile terminal, wherein
the mobile terminal comprises a route information notification unit which notifies, to the relay apparatus and the layer 2 switch in a subnet where the mobile terminal is present, route information including a data link layer unicast address of a packet addressed to the mobile terminal, and a data link layer multicast address of the mobile terminal in a case where the mobile terminal is activated and in a case where the mobile terminal switches a connection destination relay apparatus,
the route information is used by the relay apparatus and the layer 2 switch to update bridge forwarding tables (BFTs) owned thereby, and
the BFTs store the data link layer unicast address, the data link layer multicast address and a port from which the route information is received, while associating the data link layer unicast address, the data link layer multicast address and the port.

2. The communication system of claim 1, wherein the data link layer unicast address is a MAC unicast address, and the data link layer multicast address is a MAC multicast address.

3. The communication system of claim 1, wherein the route information notification unit notifies the route information by using an ICMP multicast listener report.

4. A mobile terminal disposed in a communication system including a relay apparatus which offers an access link to the mobile terminal, and a layer 2 switch which relays data between the relay apparatus and a router on a next hop from a communication destination terminal of the mobile terminal, the mobile terminal comprising:
a route information notification unit which notifies, to the relay apparatus and the layer 2 switch in a subnet where the mobile terminal is present, route information including a data link layer unicast address of a packet addressed to the mobile terminal, and a data link layer multicast address of the mobile terminal in a case where the mobile terminal is activated and in a case where the mobile terminal switches a connection destination relay apparatus, wherein
the route information is used by the relay apparatus and the layer 2 switch to update bridge forwarding tables (BFTs) owned thereby, and
the BFTs store the data link layer unicast address, the data link layer multicast address and a port from which the route information is received, while associating the data link layer unicast address, the data link layer multicast address and the port.

5. A relay apparatus disposed in a communication system including the relay apparatus which offers an access link to a mobile terminal, and a layer 2 switch which relays data between the relay apparatus and a router on a next hop from a communication destination terminal of the mobile terminal, the relay apparatus comprising:
a route information notification unit configured to acquire a data link layer unicast address of a packet addressed to the mobile terminal from the mobile terminal, configured to create a data link layer multicast address of the mobile terminal based on the data link layer unicast address, and configured to notify, to another relay apparatus and the layer 2 switch in a subnet where the mobile terminal is present, route information including the data link layer unicast address and the data link layer multicast address, in a case where the mobile terminal is activated and in a case where the mobile terminal switches a connection destination relay apparatus, wherein
the route information is used by the other relay apparatus and the layer 2 switch to update bridge forwarding tables (BFTs) owned thereby, and
the BFTs store the data link layer unicast address, the data link layer multicast address and a port from which the route information is received, while associating the data link layer unicast address, the data link layer multicast address and the port.

6. A transfer route learning method in a communication system including a mobile terminal, a relay apparatus which offers an access link to the mobile terminal, and a layer 2 switch which relays data between the relay apparatus and a router on a next hop from a communication destination terminal of the mobile terminal, the transfer route learning method comprising:

notifying, at the mobile terminal, to the relay apparatus and the layer 2 switch in a subnet where the mobile terminal is present, route information including a data link layer unicast address of a packet addressed to the mobile terminal, and a data link layer multicast address of the mobile terminal in a case where the mobile terminal is activated and in a case where the mobile terminal switches a connection destination relay apparatus; and updating, at the relay apparatus and the layer 2 switch, bridge forwarding tables (BFTs) owned thereby based on the route information, wherein the BFTs store the data link layer unicast address, the data link layer multicast address and a port from which the route information is received, while associating the data link layer unicast address, the data link layer multicast address and the port.

7. A communication system including a mobile terminal, a relay apparatus which offers an access link to the mobile terminal, and a layer 2 switch which relays data between the relay apparatus and a router on a next hop from a communication destination terminal of the mobile terminal, wherein the relay apparatus comprises a router information notification unit configured to acquire a data link layer unicast address of a packet addressed to the mobile terminal from the mobile terminal, configured to create a data link layer multicast address of the mobile terminal based on the data link layer unicast address, and configured to notify, to another relay apparatus and the layer 2 switch in a subnet where the mobile terminal is present, route information including the data link layer unicast address and the data link layer multicast address, in a case where the mobile terminal is activated and in a case where the mobile terminal switches a connection destination relay apparatus, wherein the route information is used by the other relay apparatus and the layer 2 switch to update bridge forwarding tables (BFTs) owned thereby, and the BFTs store the data link layer unicast address, the data link layer multicast and a port from which the route information is received, while associating the data link layer unicast address, the data link layer multicast address and the port.

8. A transfer route learning method in a communication system including a mobile terminal, a relay apparatus which offers an access link to the mobile terminal, and a layer 2 switch which relays data between the relay apparatus and a router on a next hop from a communication destination terminal of the mobile terminal, the transfer route learning method comprising:

acquiring, at the relay apparatus, a data link layer unicast address of a packet addressed to the mobile terminal from the mobile terminal, creating, at the relay apparatus, a data link layer multicast address of the mobile terminal based on the data link layer unicast address, and notifying, at the relay apparatus, to another relay apparatus and the layer 2 switch in a subnet where the mobile terminal is present, route information including the data link layer unicast address and the data link layer multicast address, in a case where the mobile terminal is activated and in a case where the mobile terminal switches a connection destination relay apparatus, and updating, at the other relay apparatus and the layer 2 switch, bridge forwarding tables (BFTs) owned thereby based on the route information, wherein the BFTs store the data link layer unicast address, the data link layer multicast and a port from which the route information is received, while associating the data link layer unicast address, the data link layer multicast address and the port.

* * * * *